UNITED STATES PATENT OFFICE.

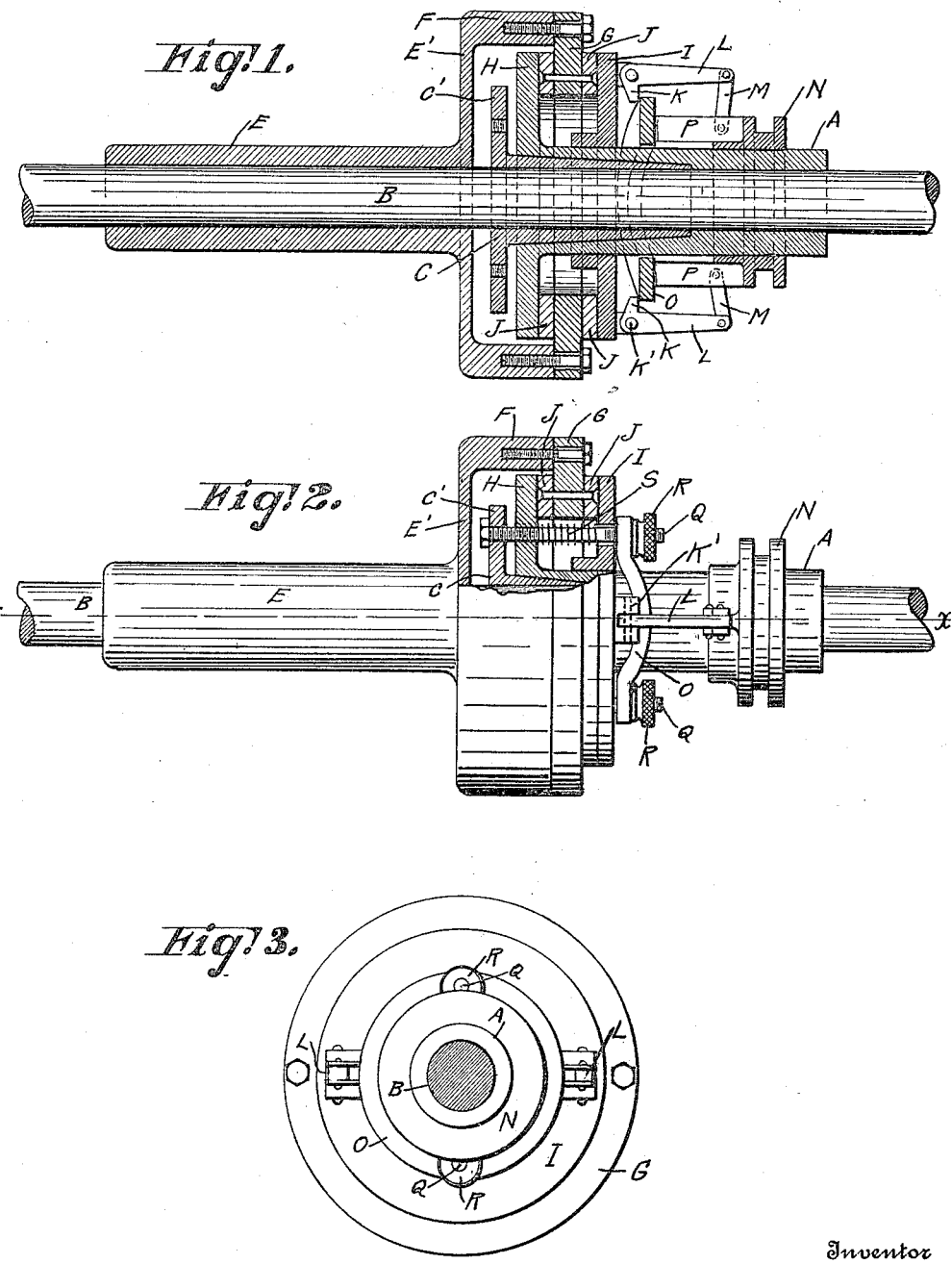

ADOLPH JAECKEL, OF MILWAUKEE, WISCONSIN, ASSIGNOR TO VERGES MANUFACTURING COMPANY, OF MILWAUKEE, WISCONSIN, A CORPORATION OF WISCONSIN.

FRICTION-CLUTCH.

1,139,765. Specification of Letters Patent. Patented May 18, 1915.

Application filed June 30, 1913. Serial No. 776,473.

*To all whom it may concern:*

Be it known that I, ADOLPH JAECKEL, a citizen of the United States, residing at Milwaukee, county of Milwaukee, and State of Wisconsin, have invented new and useful Improvements in Friction-Clutches, of which the following is a specification.

My invention relates to improvements in friction clutches of that type in which a set of friction clutch disks connected respectively with the driving and driven member, are pressed together for the transmission of motion.

The object of my invention is to provide means, operable from an ordinary shifter sleeve, for setting the clutch with balanced and adequate pressure upon the disks, and locking the shifter in clutch setting position. Also to provide a keyless clutch of the described type in which the clutch setting pressure will tend to bind the clutch more securely upon a supporting shaft.

In the drawings—Figure 1 is a longitudinal sectional view of my improved clutch drawn on line X—X of Fig. 2. Fig. 2 is a side elevation part in section on a plane exposing one of the clamping bolts. Fig. 3 is a view of the front end, showing the shaft in cross section.

Like parts are identified by the same reference characters throughout the several views.

A sleeve A on shaft B is provided with a tubular socket, which receives a split tubular wedge member C having a flange C' on its projecting end the flange C' is provided with threaded apertures C'' to receive a suitable tool for withdrawing the wedge member when it is desired to separate the parts. When the wedge member C is forced into the socket, it is compressed upon shaft B, which extends through it and through the sleeve A, and therefore serves to frictionally connect the sleeve and shaft to revolve in unison. A loose sleeve E, on the shaft, is provided with a projection E' supporting a rim F. This rim F carries an inturned flange or open centered disk G which constitutes one member of the set of friction disks.

In the construction shown, the disk G is clamped between two disks H and I carried by the sleeve A, the disk H being fixed thereon, and the disk I longitudinally movable along the sleeve. The disk G is preferably provided, on its side faces, with rings J which bear directly upon the disks H and I when the several disks are in clamping relation.

A set of elbow cranks are pivotally connected with the disk I, with short arms K extending inwardly and long arms L projecting along the shaft therefrom, and connected by links M with a shifting collar N. A yoke O loosely encircles the sleeve A. The elbow crank arms K engage the inner face of this yoke on opposite sides of the shaft, and a set of bars P, carried by the collar N, are adapted to bear against the outer surface of the yoke opposite the bearing points of the elbow levers to limit the inward movement of the shifting collar. Between the elbow cranks, the yoke bends inwardly on each side and is connected by a clamping bolt Q with the flange C', said clamping bolts extend through the flanges C', in screw threaded engagement with each of said flanges. A nut R on bolt Q provides means for adjusting the span between the yoke and flange C'. A spring S is coiled upon each bolt Q between the disks H and I and tends to separate the disks and relieve them from binding frictional contact upon intermediate disk G.

In operation, the clutch is set by moving collar N inwardly. Links M move elbow crank arms L radially outwardly. This causes the short arms K to draw upon yoke O and the pivot pins K' push upon the disk I. The yoke pulls correspondingly upon the bolts Q and this tends to draw the member H inwardly. The sleeve E is free on shaft B and therefore the pressure of the disks H and I upon member G will be equalized and as the yoke O is free to oscillate, the pull upon the clamping bolts Q, and the push upon opposite sides of the disk I through the pins K will also be equalized.

It will be observed that when the collar is in its inwardly adjusted position with bars P in contact with yoke O the links M will have moved past the pins L' connecting them with the arms L, permitting a slight inward movement of these arms. This locks the shifting collar in the inwardly adjusted position, since a retractive movement of the collar requires a slight outward movement of the arms L and a corresponding initial increase in clamping pressure, after which a continued outward movement of collar N will rapidly reduce the pressure and permit spring S to separate the clutch disks.

I claim—

1. The combination with a set of interacting driving and driven clutch disks, of an equalizing ring, clamping devices for the clutch disks, connected to opposite sides of the equalizing ring, and means for applying pressure to the ring at opposite sides thereof and between the clamping device connections.

2. The combination with a shaft, of a sleeve mounted thereon and provided with a fixed and a loose friction disk, an equalizing ring encircling said sleeve, levers pivotally connected with the loose disk and each having an arm engaging said ring, and clamping connections between the ring and the fixed disk engaging the ring between the points of lever engagement.

3. The combination with a shaft, of a sleeve mounted thereon and provided with a fixed and a loose friction disk, an equalizing ring encircling said sleeve, levers pivotally connected with the loose disk and each having an arm engaging said ring, clamping connections between the ring and the fixed disk, engaging the ring between the points of lever engagement, and means for adjusting the length of said connections.

4. The combination with a shaft, of a sleeve mounted thereon and provided with fixed and loose friction disks, a set of elbowed levers pivoted to one of said disks, with one arm of each extending along said sleeve, an equalizing ring encircling said sleeve and loosely engaged by the other arms of said levers, clamping means for drawing said disks together connected with the equalizing ring between the levers, and a shifting member provided with means for spreading the first mentioned arms of said levers, said levers being arranged, when spread, to impart a separating movement to the loose disk and equalizing ring respectively.

5. The combination with a shaft, of a sleeve mounted thereon and provided with fixed and loose friction disks, an equalizing ring loosely encircling said sleeve and connected therewith by clamping connections extending through said disks, and means for separating the ring and loose disk, operative upon the ring at points between the clamping connections, whereby, when a separating pressure is applied between the loose disk and ring, the disk will be forced inwardly and the ring will draw upon the clamping connections, substantially as described.

6. The combination with a shaft, of a sleeve mounted thereon, a split tubular wedge partially interposed between the sleeve and shaft, a set of friction disks having fixed and movable connection with said sleeve, a set of clamping bolts connected with said wedge and extending through the disks, an equalizing ring connected with said bolts, and a set of levers pivoted to the movable disk and adapted to bear upon said ring between the bolts, substantially as described.

7. The combination with a shaft, of a sleeve mounted thereon, a split tubular wedge partially interposed between the sleeve and shaft, a set of friction disks having fixed and movable connection with said sleeve, a set of clamping bolts connected with said wedge and extending through the disks, an equalizing ring connected with said bolts, and a set of levers pivoted to the movable disk and adapted to bear upon said ring between the bolts, together with a shifting member and link connections between said member and said levers, substantially as described.

8. The combination with a friction clutch, of a set of clamping bolts, an equalizing ring connected therewith, a set of clutch setting levers adapted to engage said equalizing ring between the bolts, said levers having substantially parallel arms, a shifting member linked to said arms and adapted to spread the same, and bars on said member adapted to bear upon the equalizing ring when the lever arms are spread, substantially as described.

9. The combination with a friction clutch, of a set of clutch setting levers, a shifting member linked to said levers and adapted to spread the levers when said member is shifted, and means for automatically equalizing the pressure of the levers upon the clutch.

10. The combination, with a set of friction clutch disks, of a set of levers for actuating said disks to clutch setting position, and means for automatically equalizing the pressure exerted by said levers upon the disks.

11. In a friction clutch, the combination with a shaft, a rim supported to rotate about the shaft and having an inwardly projecting friction disk, another friction disk supported from the shaft in fixed relation thereto, means for binding said friction disks together in frictional contact, an equalizing ring loosely encircling the shaft, and having opposite sides thereof connected with said binding means, and a set of operating levers adapted to engage the aqualizing ring at points intermediate of the connection with said binding means, a shifting member movable along the shaft and having link connections with said levers and bars on said shifting member adapted to engage the equalizing ring to stop the inward movement of the member when the links move past the line of centers, substantially as described.

In testimony whereof I affix my signature in the presence of two witnesses.

ADOLPH JAECKEL.

Witnesses:
LEVERETT C. WHEELER,
H. C. VAN RYN.